United States Patent [19]
Manzoni

[11] Patent Number: 4,645,164
[45] Date of Patent: Feb. 24, 1987

[54] SUPPORT FOR FITTING AND LOCKING A MIRROR SUPPORT ON AN ADJUSTABLE MEMBER OF A VEHICLE REARVIEW MIRROR

[75] Inventor: Stephane Manzoni, Saint Claude, France

[73] Assignee: Manzoni-Bouchot, France

[21] Appl. No.: 598,886

[22] Filed: Apr. 10, 1984

[51] Int. Cl.$^4$ .............................................. B60R 1/06
[52] U.S. Cl. ............................... 248/475.1; 248/316.7
[58] Field of Search ............ 248/475.1, 475 B, 316.7, 248/309.1, 310, 466

[56] References Cited

U.S. PATENT DOCUMENTS

| | | | |
|---|---|---|---|
| 2,724,996 | 11/1955 | O'Shei | 248/475.1 |
| 2,876,972 | 3/1959 | Silverman | 248/475.1 |
| 3,131,251 | 3/1964 | Ryan | 248/475.1 |
| 4,056,253 | 11/1977 | Repay et al. | 248/479 |
| 4,094,485 | 6/1978 | O'Callaghan | 248/309.1 |
| 4,488,778 | 12/1984 | Polzer et al. | 248/466 X |

FOREIGN PATENT DOCUMENTS 2748823 5/1979 Fed. Rep. of Germany .
2907433 9/1980 Fed. Rep. of Germany .

Primary Examiner—Ramon S. Britts
Assistant Examiner—Karen J. Chotkowski
Attorney, Agent, or Firm—Remy J. VanOphem

[57] ABSTRACT

A device for fitting and locking a mirror support on a directionally-adjustable plate actuated by a mechanism to which it is connected and which is mounted in a vehicle rearview mirror casing. The mirror support is provided with an opening in which the plate is fitted by at least one of its edges and the support is locked in position on one of the other edges of the plate by means of a locking member, mounted for axial sliding on the mirror support, and adapted to come to rest in a locking position against at least one member of the plate.

11 Claims, 10 Drawing Figures

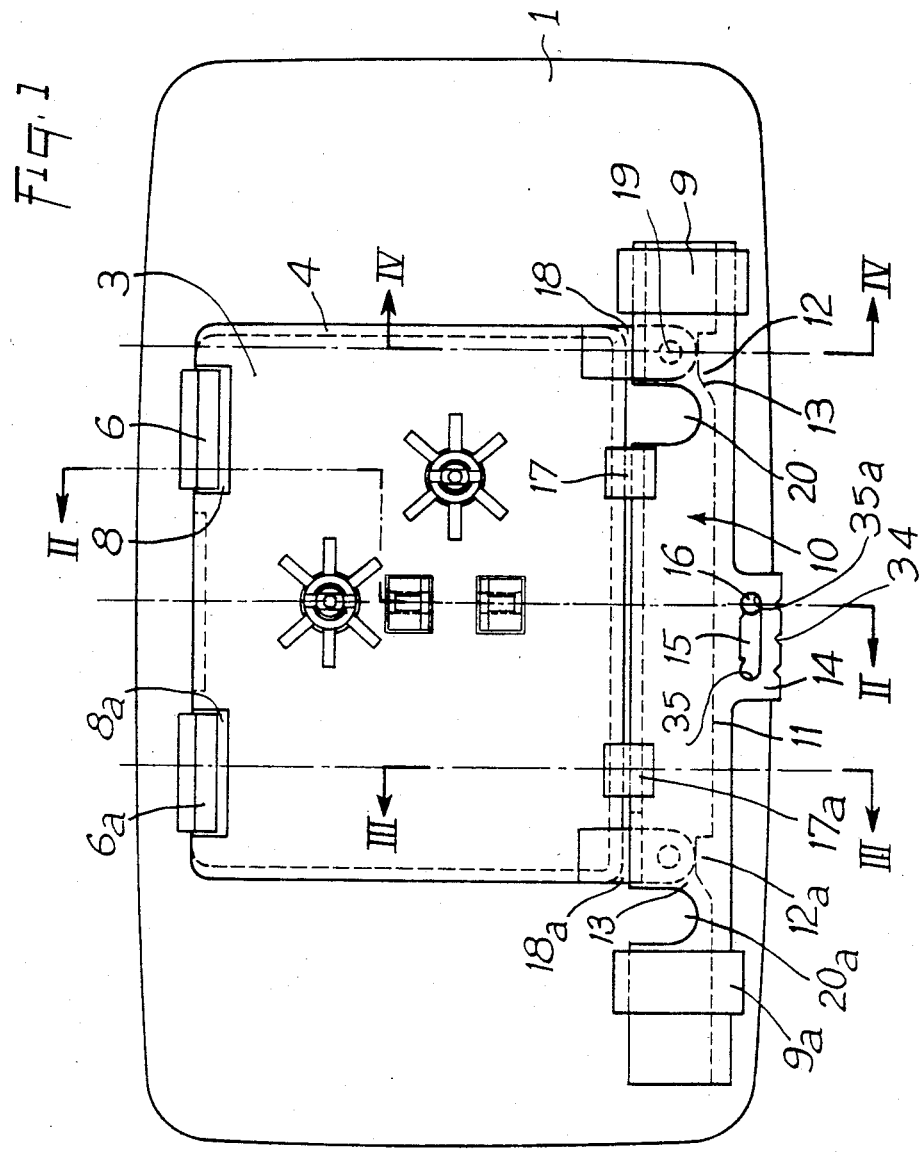
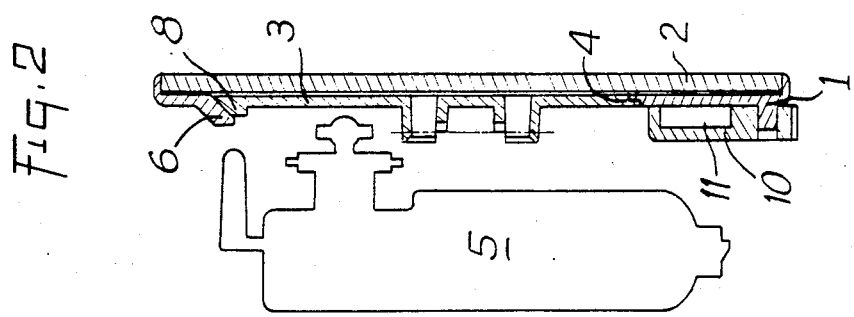

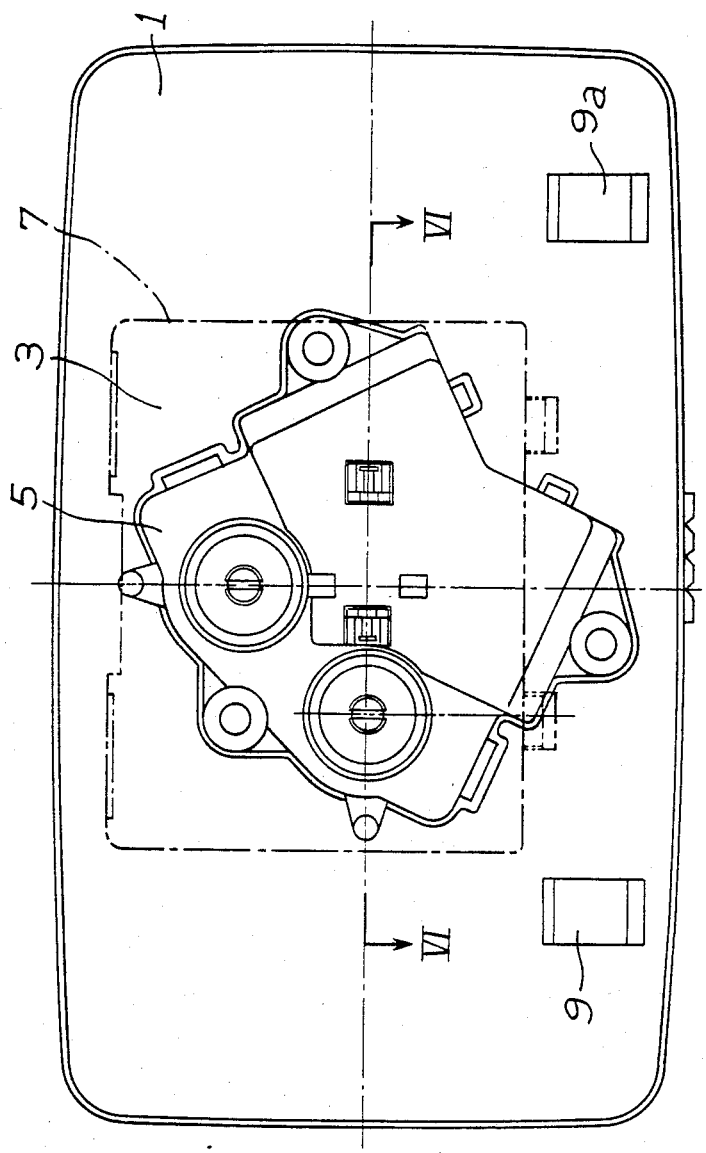
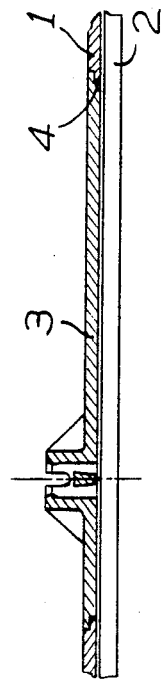
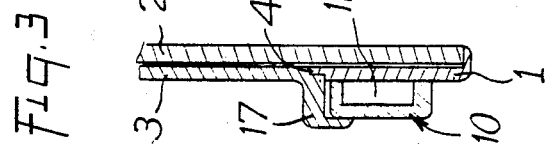

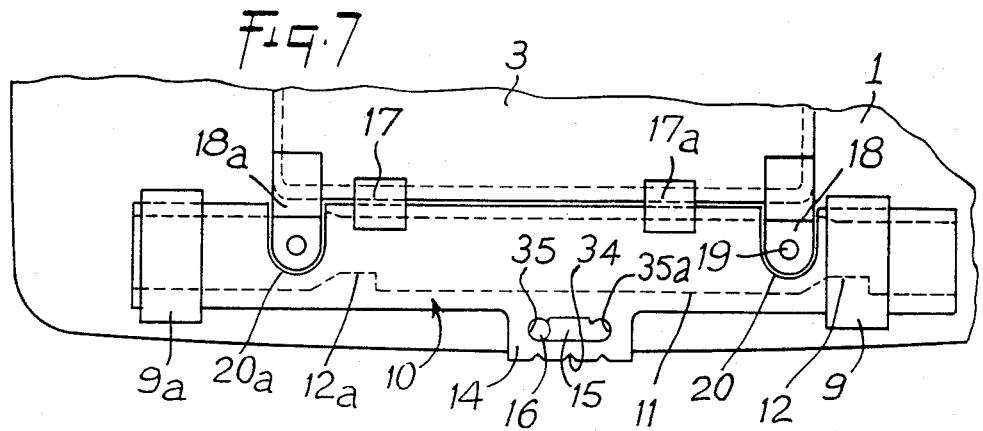
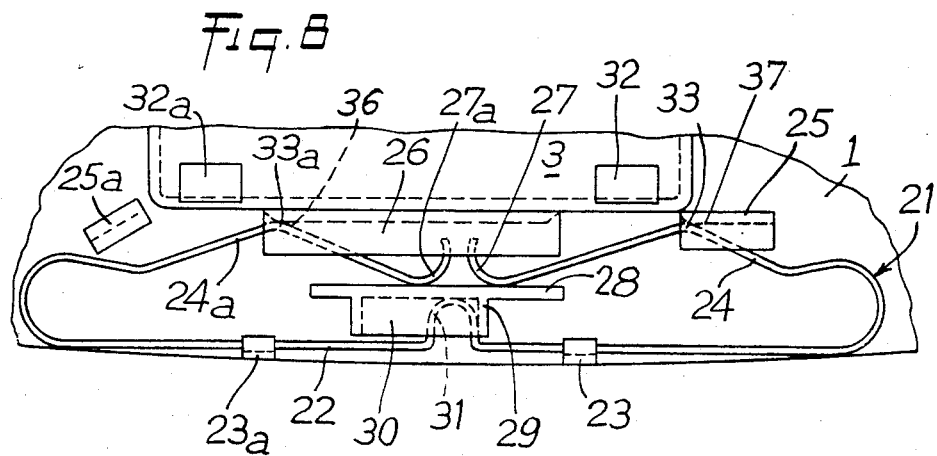
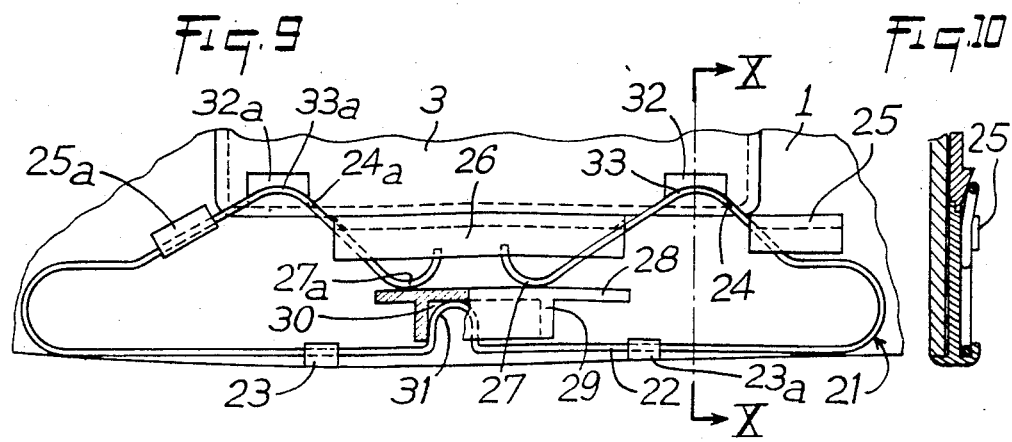

SUPPORT FOR FITTING AND LOCKING A MIRROR SUPPORT ON AN ADJUSTABLE MEMBER OF A VEHICLE REARVIEW MIRROR

BACKGROUND OF THE INVENTION

The present invention relates to a device for fitting and securing a mirror support on an adjustable member of a vehicle rearview mirror assembly.

When the mirror of a vehicle rearview mirror breaks, it is often necessary to replace the whole mirror assembly, which is particularly expensive in the case of an electrically controlled rearview mirror.

It is obviously more advantageous for users to have the possibility of replacing only the mirror.

A mirror-holder supporting device is known which is removably mounted on a directionally-adjustable plate actuated by mechanism to which it is connected, with a fitting and locking mechanism being constituted by a rotary clamp and a bayonet system.

This device, however, is not completely satisfactory and it is the object of the present invention to provide a simpler and less expensive device.

SUMMARY OF THE INVENTION

According to the present invention, the mirror support is provided with an opening in which a plate is held by at least one of its edges. The mirror support is secured in position on one of the other edges of the plate by a securing member mounted for sliding axially on the mirror support and adapted to take a secured position by resting against at least one member of the plate.

BRIEF DESCRIPTION OF THE DRAWINGS

The invention will be more readily understood upon reading the following description with reference to the accompanying drawings, in which:

FIG. 1 is an elevational view of the rear face of the mirror equipped with the fitting and securing device according to the invention;

FIG. 2 is an offset cross-sectional view of the mirror support taken along line II—II of FIG. 1;

FIG. 3 is a cross-sectional view of the device taken along line III—III of FIG. 1;

FIG. 4 is an elevational view of a cross-section of the device taken along line IV—IV of FIG. 1;

FIG. 5 is an elevational view of the front face of the mirror support;

FIG. 6 is a cross-sectional view of the mirror support and of the plate taken along line VI—VI of FIG. 5;

FIG. 7 is an elevational view of the rear face of the securing device in the unlocked position;

FIG. 8 is an elevational view of the rear face of another embodiment of the positioning and securing device in the retracted position;

FIG. 9 is a similar view to that shown in FIG. 8, but in the securing position; and FIG. 10 is a cross-sectional view along line X—X of FIG. 9.

DETAILED DESCRIPTION OF THE PREFERRED EMBODIMENT

FIGS. 1 to 6 show the inner elements of a rearview mirror assembly contained in a casing, not shown in the drawings, which is designed to be mounted on the outside of a vehicle. The inner elements are connected to a mirror support which is adjustable from inside the vehicle. The inner elements of the rearview mirror include a support 1 on which is mounted a mirror 2 and which is provided with a central opening 7 by which it is fitted on the periphery of a plate 3 by means of a rabbeted joint 4. The plate 3, which is orientable in two perpendicular directions, horizontal and vertical, is actuated by a mechanism 5, as illustrated in FIG. 2, of known type, to which it is permanently connected.

According to the present invention, the support 1 of the mirror is removably mounted on the plate 3, thus, permitting the replacement of the mirror in case of breakage.

To achieve this effect, the mirror support 1 has, close to the upper part of the central opening 7, two hook members 6 and 6a, as shown in FIGS. 1 and 2, into which are engaged bosses 8 and 8a provided on the upper edge of the plate 3.

At the lower part, and on its rear face, the support 1 has two guiding members 9 and 9a which retain a bar 10 made of plastic material. The bar 10 is designed to secure the support 1 in position on the plate 3, and the bar 10 has an axial groove 11 having an opening directed towards the rear face of the support 1. Two bosses or cams 12 and 12a having inclined planes 13 are located inside the axial groove.

A boss 14 is provided at the lower part of the bar 10. The boss 14 is perforated with an oblong hole 15 for receiving a lug 16 which can occupy two outermost detent positions 35 and 35a, a locking or securing position, and an unlocking or retaining position. The boss 14 has a series of notches 34 and can be moved by means of a tool through an orifice provided in the casing.

The plate 3 is provided with two external lugs 17 and 17a on either side of its median axis and in opposite relation to the bosses 8 and 8a. The lugs 17 and 17a rest against the outer face of the bar 10 and the plate 3 also has, at its two ends on the side opposite the two bosses 8 and 8a, two internal lugs 18 and 18a fitted in the axial groove 11 and perforated to receive a stud 19 integral with the support 1.

Openings 20 and 20a are provided in the bar 10 to allow passage of the internal lugs 18 and 18a when the bar 10 is in the retaining position. FIG. 1 shows the plate 3 in the locked position with the central opening 7 of the mirror support 1 and the hook members 6 and 6a being fastened on the bosses 8 and 8a.

In the locked position, the external lugs 17 and 17a rest on the outer face of the bar 10 and the internal lugs 18 and 18a engage the studs 19 and rest against the inner face of the axial groove 11 of the bar. The lower end of the internal lugs 18 and 18a rest against the cams or bosses 12 and 12a to secure the support tightly to the plate 3, with the axis of the plate 3 perpendicular to the axis of the bar 10.

In order to detach the support 1 and its mirror, one slides the bar 10, by means of the boss 14, towards the right, as shown in FIG. 7, to bring the openings 20 and 20a of the bar 10 into alignment with the internal lugs 18 and 18a to release the internal lugs 18 and 18a from the cams 12 and 12a. When the device is unlocked, as illustrated in FIG. 7, it becomes possible to detach the internal lugs 18 and 18a from the studs 19 and to release the mirror support 1 from the plate 3.

FIGS. 8 and 9 illustrate another embodiment in which the plastic bar 10 is replaced by a flexible steel wire element 21 which includes a rectilinear part 22 and two branches, symmetrically bent in towards the rectilinear part. The rectilinear part 22 is mounted for axial sliding in guide members 23 and 23a integral with the mirror support 1, and the branches present two deformable bent portions 24 and 24a guided, on the one hand, in grooves provided in end guiding members 25 and 25a, and on the other hand, in a groove of a central guiding member 26. The curled ends 27 and 27a of the branches rest against a face 28 of a boss 29. The boss 29 is formed integrally with the mirror support 1, as are guide members 25 and 25a and 26.

A housing 30 is provided in the boss 29, and a loop 31 is provided in the middle of the rectilinear part 22, movable within the housing 30. Thus, the loop 31 of the flexible steel wire element 21 can be manipulated through an orifice situated at the lower part of the casing.

Two bosses 32 and 32a are provided close to the lower edge of the plate 3. The bosses 32 and 32a each have an inclined face against which top parts 33 and 33a of the bent portions 24 and 24a of the flexible steel wire element 21 can rest when the flexible steel wire element 21 is in the unlocked position, as shown in FIGS. 9 and 10. In this case, the curled ends 27 and 27a are in resting contact on the face 28 and the deformable bent portions 24 and 24a are engaged in the grooves of the end guiding members 25 and 25a and the central guiding member 26 where they are pressed against the rear face of the support 1 and against the bosses 32 and 32a of the plate 3, thus locking the mirror support 1 in position. If the flexible steel wire element 21 is moved towards the right by means of the loop 31, as is shown in FIG. 8, the top parts 33 and 33a of the bent portions 24 and 24a leave the bosses 32 and 32a of the plate 3 and come to rest against the inner edges 36 and 37 of the guiding members 26 and 25. The compression of the bent portions 24 and 24a to a retracted position permits the release of the support 1 from the plate 3.

It is also possible to provide recesses on the plate 3 to receive the top parts 33 and 33a of the bent portions 24 and 24a in the locking position.

The invention is in no way limited to the description given herein above, and on the contrary includes any modifications that can be brought thereto without departing from the scope of the claims hereof.

What is claimed is:

1. A removable mirror support device for a vehicle rearview mirror comprising:
    a plate member having a periphery, said periphery having a plurality of edges;
    a removable mirror support member adapted to be secured on said plate member, said removable mirror support member having a central opening, said central opening having a shape which corresponds to said periphery of said plate member whereby said plate member can be attached to said removable mirror support member with said periphery of said plate member overlying said central opening of said removable mirror support member; and
    means for releasably securing and fitting said removable mirror support member to said plate member said means comprising at least one rest member attached to said plate member and at least one guide member attached to said support member and having an elongated member longitudinally movable therein, wherein said elongated member can be placed in varying relationship on said at least one rest member whereby said support member is secured to said plate member.

2. A removable mirror support device for a vehicle rearview mirror according to claim 1 and further wherein said plate member is adjustable in its position, and further comprising:
    remotely operable mirror adjusting means for adjusting the position of said plate member from a location remote from said plate member.

3. A removable mirror support device for removing a mirror support attached to a remotely operable mirror adjusting means, said removable mirror support device comprising:
    a support member having a central opening;
    a plate member mounted in said central opening, said plate member adapted to engage said mirror adjusting means; and
    means for releasably securing said plate member to said support member, said means for releasably securing said plate member to said support member comprising:
    at least one guide member attached to said support member;
    a bar member slidably mounted in said at least one guide member, said bar member further being spaced a predetermined distance from said central opening;
    at least one internal lug attached to said plate member, said at least one internal lug having a portion overlying said support member, said portion of said at least one internal lug further being interposed said bar member and said support member;
    at least one external lug attached to said plate member, said at least one external lug having a portion overlying said bar member;
    means for securing said plate member to said support member when said bar member is in a first predetermined position; and
    means for releasing said plate member from said support member when said bar member is in a second predetermined position.

4. The removable mirror support device as claimed in claim 3 wherein said means for releasably securing said plate member to said support member comprises:
    a hole in said at least one internal lug;
    at least one stud attached to said support member, said at least one stud projecting into said hole of said at least one internal lug for locating said plate member;
    at least one cam surface integral with said bar member, said at least one cam surface biasing said at least one internal lug when said bar member is in said first predetermined position; and
    at least one groove defined in said bar member, said at least one groove juxtaposed said support member, said at least one internal lug further being located in said at least one groove when said bar member is in said first predetermined position whereby said plate member is secured to said support member.

5. The removable mirror support device as claimed in claim 4 wherein said means for releasably securing said plate member to said support member further comprises:
    a boss member projecting from said bar member, said boss member being manually engageable to move said bar member;
    an oblong slot in said boss member, said oblong slot having at least one securing detent; and
    a locating stud attached to said support member, said locating stud projecting into said oblong slot, said locating stud further engaging said at least one securing detent when said bar member is moved into said first predetermined position to secure said plate member to said support member.

6. The removable mirror support device as claimed in claim 3 wherein said means for releasing said plate member from said support member comprises:
at least one opening in said bar member, said at least one internal lug being aligned with said at least one opening when said bar member is in said second predetermined position to permit removal of said plate member from said support member.

7. A removable mirror support device for removing a mirror support attached to a mirror adjusting means, said removable mirror support device comprising:
a support member havina first side and a second side, said support member further having a central opening located between said first side and said second side of said support member;
a plate member having a first side and a second side, said plate member being located in said central opening such that said first side of said plate member is adjacent to said first side of said support member and further such that said second side of said plate member is adjacent to said second side of said support member, said plate member further being adapted to be attached to said mirror adjusting means;
at least one first boss member projecting from said plate member along said first side of said plate member;
at least one hook member projecting from said support member and extending over said central opening, said at least one hook member engaging said at least one first boss member when said plate member is located in said central opening;
at least one internal lug extending from said second side of said plate member, said at least one internal lug projecting partially over said second side of said support member when said plate member is located in said central opening;
at least one external lug extending from said second side of said plate member, said at least one external lug projecting partially over said second side of said support member when said plate member is located in said central opening;
a hole in said at least one internal lug;
at least one stud mounted to said support member along said second side of said support member, said at least one stud projecting from said support member to engage said hole in said at least one internal lug;
at least one guide member attached to said support member;
a bar member slidably mounted in said at least one guide member, said bar member further being slidably interposed said at least one internal lug of said plate member and said at least one external lug of said plate member, said bar member having a first predetermined position and a second predetermined position;
at least one groove in said bar member, said at least one groove cooperating with said at least one internal lug to hold said at least one internal lug against said support member when said bar member is in said first predetermined position whereby said plate member is secured to said support member;

at least one cam surface integral with said bar member, said at least one cam surface biasing said at least one internal lug when said bar member is in said first predetermined position;
at least one opening in said bar member spaced a predetermined distance from said at least one stud, said at least one opening cooperating with said at leaste one internal lug when said bar member is in said second predetermined position to permit removal of said plate member from said support member;
a second boss member projecting from said bar member, said second boss member having an oblong slot, said oblong slot having at least one releasing detent and at least one securing detent;
a locating stud attached to said support member, said locating stud projecting into said oblong slot, said locating stud further engaging said at least one securing detent when said bar member is moved into said first predetermined position to secure said plate member to said support member, said locating stud further engaging said at least one releasing detent when said bar member is moved into said second predetermined position; and
at least one notch in said second boss member, said at least one notch being engagable to move said bar member to and from said first predetermined position and said second predetermined position.

8. A removable mirror support device for removing a mirror support attached to a mirror adjusting means, said removable mirror support device comprising:
a support member having a first side and a second side, said support member further having a central opening located between said first and said second side of said support member;
a plate member located in said central opening, said plate member having a first side and a second side, said plate member further being adapted to attach to said mirror adjusting means;
at least one first boss member projecting from said plate member along said first side of said plate member;
at least one hook member projecting from said support member and extending over said central opening, said at least one hook member engaging said at least one first boss member when said plate member is located in said central opening;
a plurality of guiding members projecting from said support member, said plurality of guiding members spaced a predetermined distance from said central opening along said second side of said support member;
at least one boss member projecting from said plate member, said at least one boss member spaced a predetermined distance from said second side of said plate member;
a housing boss member attached to said support member, said housing boss member having a face portion and an open side opposite said face portion, said face portion facing said second side of said plate member, said face portion further being spaced a predetermined distance from said second side of said plate member; and
a flexible wire member having a central portion mounted to said support member, said central portion having a loop portion mounted in said open side of said housing boss member, said flexible wire member further comprising at least one end portion having a deformable bent portion terminating in a curled end, said curled end slidably engaging said face portion of said housing boss member to communicate therewith, said deformable bent portion further comprising a top portion adapted to communicate with said plate member when said flexible wire is in a first predetermined position to secure said plate member to said support member, said top portion further adapted to communicate with said plurality of guiding members when said flexible wire member is in a second predetermined position to permit detachment of said plate member from said support member.

9. A removable mirror support device for removing a mirror support attached to a remotely operable mirror adjusting means, said removable mirror support device comprising:
- a support member having a central opening;
- a plate member mounted in said central opening, said plate member adapted to engage said mirror adjusting means; and
- means for releasably securing said plate member to said support member, said means for releasably securing said plate member to said support member comprising:
- at least one boss member attached to said support member, said at least one boss member having a face portion extending from said support member and a hollow housing portion defined by said at least one boss member and said support member;
- a central guide member mounted to said support member in a predetermined position relative to said face portion of said at least one boss member; said central guide member further have a cantilever portion extending from said support member to define a groove;
- at least one end guide member attached to said support member, said at least one end guide member having a cantilever portion extending from said support member to define a groove; and
- a resilient wire member having a central portion mounted to said support member, said central portion further comprising a loop portion located in said hollow housing portion of said at least one boss member, said resilient wire member further comprising at least one end portion having a deformable bent portion terminating in a curled end, said curled end slidably engaging said face portion of said at least one boss member and said groove defined by said cantilever portion of said central guide member to communicate therewith, said deformable bent portion further comprising a top portion adapted to communicate with said plate member when said resilient wire member is in a first predetermined position to secure said plate member to said support member, said top portion further adapted to communicate with one of said at least one end guide member and central guide member when said resilient wire member is in a second predetermined position to permit detachment of said plate member from said support member.

10. The removable mirror support device as claimed in claim 9 wherein said plate member further comprises at least one raised portion spaced a predetermined distance relative to the outer periphery of said plate member and wherein said top portion of said deformable bent portion of said at least one end portion of said resilient wire member is located on said at least one raised portion of said plate member when said resilient wire member is in said first predetermined position.

11. The removable mirror support device as claimed in claim 9 further comprising means for biasing said plate member whereby said biasing means biases said plate member to secure said plate member in said central opening of said support member.

* * * * *

UNITED STATES PATENT AND TRADEMARK OFFICE
CERTIFICATE OF CORRECTION

PATENT NO. : 4,645,164
DATED     : February 24, 1987
INVENTOR(S) : Stephane Manzoni It is certified that error appears in the above-identified patent and that said Letters Patent is hereby corrected as shown below:

Column 3, line 8, after "are" insert ---- the ----.

In The Claims

Column 5, line 16, delete "havina" and insert ---- having a ---.

Column 7, line 35, delete "have" and insert ---- having ----.

Signed and Sealed this

Twentieth Day of October, 1987

Attest:

DONALD J. QUIGG

Attesting Officer

Commissioner of Patents and Trademarks